Patented Nov. 21, 1950

2,531,137

UNITED STATES PATENT OFFICE 2,531,137

PREPARATION OF SULFURIC ACID AND SODIUM CHLORIDE FROM SODIUM SULFATE SOLUTIONS

Otto Laubi and Max Gerber, Zurich, Switzerland

No Drawing. Application February 1, 1947, Serial No. 725,962. In Switzerland June 25, 1946

4 Claims. (Cl. 23—167)

The present invention relates to the simultaneous production of sulphuric acid, hydrochloric acid and sodium chloride from sodium sulphate or bisulphate.

In numerous processes of chemical industry aqueous solutions are produced which contain as components, inter alia, large amounts of sodium sulphate or bisulphate as by-products. The rational use of such by-products is of economic importance.

On account of the limited capacity of the market this use is however very often uneconomic and there are industries in which large amounts of sodium sulphate can find no application.

It is generally known that by leading a mixture of chlorine and sulphur dioxide into water, hydrochloric and sulphuric acids are produced according to the equation following $$Cl_2 + SO_2 + 2H_2O \rightarrow H_2SO_4 + 2HCl \qquad (1)$$

It has now been found that this reaction also occurs if the gas mixture is led not into water, but into a solution of salts e. g. sodium sulphate or bisulphate, so that the hydrochloric acid produced reacts directly with the dissolved salts according to the equation $$Na_2SO_4 + 2HCl \rightarrow 2NaCl + H_2SO_4 \qquad (2)$$

The total reaction therefore may be summarised as the following $$Cl_2 + SO_2 + Na_2SO_4 + 2H_2O \rightarrow 2H_2SO_4 + 2NaCl \qquad (3)$$

It is apparent from the above equation that a certain amount of water is used up in the reaction. If water is present in excess then this excess appears after the reaction in the form of a diluent of the correspondingly formed amounts of sulphuric acid.

As soon as the solution has been saturated sufficiently with hydrochloric acid the sodium chloride begins to precipitate and can then be filtered off from the solution and collected. The hydrogen chloride formed in excess can easily be separated from the sulphuric acid by heating so that both acids are produced in pure form. In order to remove completely the starting gases dissolved in the liquid and the hydrogen chloride the condition is that a sulphuric acid concentration of at least 70–75% must be obtained. This necessity can however affect the economy of the process unfavourably since the heat necessary for evaporation is relatively large.

Extensive researches have now shown that the reaction as shown in Equation 3 above can be carried out not only in aqueous solution, but that solid sulphate or bisulphate containing water of crystallisation can be treated directly with chlorine and sulphur dioxide whereby almost theoretical yields of hydrochloric acid, sulphuric acid and sodium chloride can be obtained. Moreover it has been found that it is not necessary to employ sulphur dioxide with chlorine, but that elementary sulphur can also be caused to react directly. Obviously it is also possible to lead in sulphur trioxide in order to raise the sulphuric acid concentration. A further variant of the process consists in that Glauber's salt is first treated with hydrogen chloride then the precipitated salt filtered off and chlorine and sulphur dioxide led into the mother liquor. Thereby sulphuric acid and hydrochloric acid are formed, with increasing concentration of sulphuric acid the hydrogen chloride is driven off and may be employed for further treatment of Glauber's salt. The reaction mechanism is as follows:

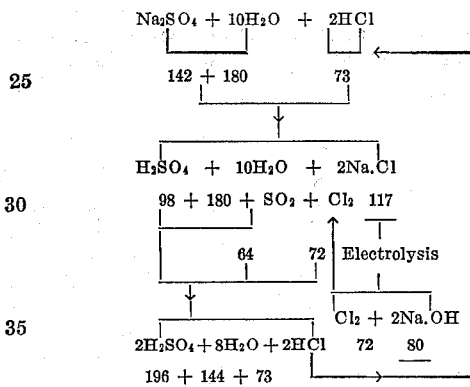

The new process is technically valuable and forms the basis of a new process for making use of sodium sulphate or bisulphate. The new process thus uses as starting materials preferably solid sulphate or bisulphate containing water of crystallisation or solutions in which these sulphates or bisulphates form one constituent so that e. g. spinning solutions from the viscose industry are very valuable for working up. The difference whether the operation is carried out in solution or with solid salts consists actually in that in case of solutions corresponding to the different amount of water, more sulphuric acid and hydrochloric acid are formed. The evaporation heat to be used when working with chlorine and sulphur dioxide as contrasted with e. g. the method of working with gaseous hydrogen chloride is in any case lessened, since in fact the reaction as shown in Equation 3 consumes water. The sulphuric acid concentration can without difficulty, without evaporation, be carried to at least 60%.

An example of the technical carrying out of the process according to the invention will be subsequently described.

As reaction vessel an acid resistant coated container with a stirring apparatus, surrounded by a cooling jacket serves. There could also be used several reaction vessels surrounded by a cooling jacket. The solid sodium sulphate or bisulphate is introduced into the container, and with constant stirring chlorine and sulphur dioxide are supplied. With sulphate decahydrate a strong cooling of the reaction material first occurs. The mass begins to melt at about 8° C., without separation of anhydrous sulphate. The further addition of chlorine and sulphur dioxide brings about a strong heating and sodium chloride slowly separates. With steady stirring and feeding in of chlorine and sulphur dioxide, water is fed through the cooling jacket and the reaction material cooled in this manner until the salt has been completely precipitated. The lye is separated from the salt by centrifuging or by filtration. The dissolved chlorine and sulphur dioxide also the hydrochloric acid can finally be removed from the sulphuric acid by leading in air.

It is also possible to combine the process described with an electrolysis of alkali chloride so that from the precipitated salt on the one hand alkali lye and on the other hand chlorine is prepared which may be used again for again decomposing sulphate. Thereby a closed cycle is set up which continuously consumes sodium sulphate and sulphur dioxide or sulphur and yields alkali and chlorine. Actually small losses of chlorine and sulphur dioxide are to be replaced.

What we wish to secure by U. S. Letters Patent is:

1. A process of producing sulphuric acid and sodium chloride, including the steps of introducing sulphur dioxide and chlorine into an aqueous solution of sodium sulphate in which the reaction is carried out at temperatures which do not exceed 100 degrees centigrade.

2. A process according to claim 1, in which a waste liquor containing sodium sulphate in substantial amount such as a spent bath of the viscose spinning or casting processes is employed as starting material.

3. A process of producing sulphuric acid and sodium chloride, including the steps of introducing sulphur dioxide and chlorine into an aqueous solution of sodium sulphate, and cooling the reaction material during the reaction to such a degree that the sodium chloride completely precipitates from the solution, filtering off the sodium chloride when so precipitated and separating the sulphuric acid and hydrogen chloride.

4. A process for producing sulphuric acid and sodium chloride, including the steps of introducing sulphur dioxide and chlorine into an aqueous solution of sodium sulphate and cooling the reaction material during the reaction to a temperature below 100° C.

OTTO LAUBI.
MAX GERBER.

REFERENCES CITED

The following references are of record in the file of this patent:

UNITED STATES PATENTS

| Number | Name | Date |
|---|---|---|
| 2,276,079 | Maude | Mar. 10, 1942 |
| 2,375,000 | Iler | May 1, 1945 |
| 2,375,002 | Iler | May 1, 1945 |

OTHER REFERENCES

Cumming: Hydrochloric Acid and Salt Cake, vol. 5, Van Nostrand Co. 1923. (Pages 28 and 47.)

Mellor: Treatise on Inorganic and Theoretical Chemistry, volume 2, Longmans, Green and Co., 1922. (Page 672.)